Figure 1:
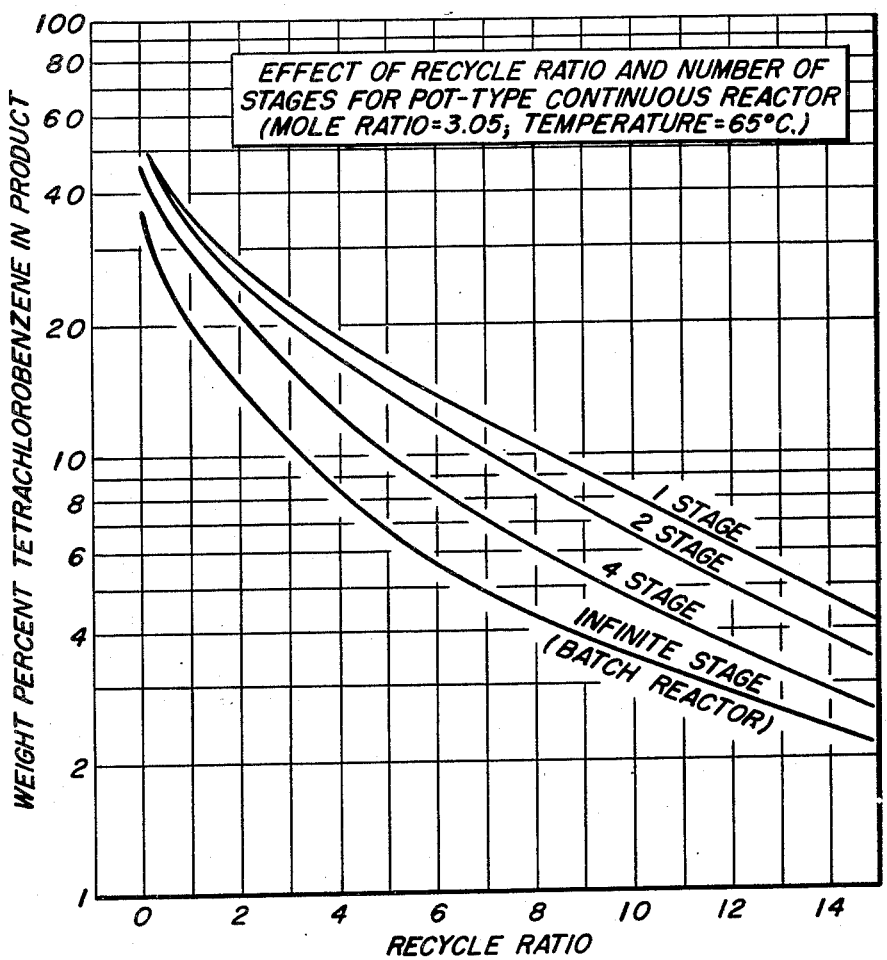

Sept. 28, 1954  J. T. CLARKE ET AL  2,690,458
MANUFACTURE OF TRICHLOROBENZENE

Filed Dec. 20, 1951  3 Sheets-Sheet 3

INVENTOR.
JOHN T. CLARKE
STEPHEN N. HALL
PAUL E. WEIMER
BY
Kenneth Swartwood

Patented Sept. 28, 1954

2,690,458

UNITED STATES PATENT OFFICE 2,690,458

MANUFACTURE OF TRICHLOROBENZENE

John T. Clarke, Stephen N. Hall, and Paul E. Weimer, Baton Rouge, La., assignors to Ethyl Corporation, New York, N. Y., a corporation of Delaware Application December 20, 1951, Serial No. 262,602

2 Claims. (Cl. 260—650)

This invention relates to the manufacture of trichlorobenzene and more particularly, but not exclusively, to a continuous process for the manufacture of trichlorobenzene having a concentration of tetrachlorobenzene as an impurity therein below about 10 weight percent.

It has been proposed in U. S. Patent No. 2,479,903, to employ trichlorobenzene as a scavenger with lead antiknock compounds. Scavengers are materials employed with lead antiknock compounds in fuels for internal combustion engines to produce, during combustion, volatile lead compounds which are exhausted from the engine. In general, scavengers reduce the amount of less volatile lead compounds which otherwise form during combustion and collect on engine parts. As pointed out in the above patent, not all scavengers containing a given quantity of a specific halogen are equally efficacious. The unit effectiveness of a scavenger within the cylinder is called intrinsic scavenging efficiency, and it has been found that it varies for different halogen compounds. Trichlorobenzene has a particularly high intrinsic scavenging efficiency. Other desirable properties of this scavenger include stability when stored in a mixture of lead antiknock compounds, mixability with lead antiknock compounds, freedom from reduction in effectiveness of lead antiknock compound, and volatility giving a suitable pattern of distribution in the engine relative to that of lead antiknock compounds under the range of intake manifold conditions encountered in service.

All of the known methods for manufacture of trichlorobenzene result in the formation of a large proportion of tetrachlorobenzene as an impurity in the trichlorobenzene product. The latter undesired impurity has a vapor pressure considerably lower than trichlorobenzene as well as tetraethyllead, and thus the uniform distribution and other desirable characteristics of trichlorobenzene as a scavenger are materially impaired.

Moreover, in addition to impairing the use of trichlorobenzene as a scavenger, the tetrachlorobenzene formation requires considerable additional quantities of valuable chlorine and thus materially affects the economy of the process.

When trichlorobenzene is produced in the reaction of benzene and chlorine, using approximately stoichiometric quantities (3.0 moles of chlorine per mole of benzene), under typical batch-type conditions, about 23 percent by weight of the total product is the undesired tetrachlorobenzene. When the same reaction is carried out under pot-type continuous reactor conditions, the product contains up to about 50 percent by weight of tetrachlorobenzene as an undesired impurity. Likewise, when the reaction is conducted in a pot-type continuous reactor in a plurality of stages (using multiple chlorine injection), such as when employing two or more reactors in series, the product contains between about 50 and 30 weight percent of tetrachlorobenzene, depending upon the number of stages employed.

It is accordingly an object of the present invention to provide a process for the manufacture of trichlorobenzene having a relatively low concentration of tetrachlorobenzene as an impurity therein and preferably below about 10 weight percent of the total product, such that it may be used directly as a scavenger without the necessity of further treatment and purification.

Another object of the present invention is to provide a continuous process of the above type in which a relatively uniform product and a high throughput capacity may be obtained within a given reactor while employing minimum operating labor, and relatively simple and economical process equipment.

Other objects or advantages of this invention will become apparent as the description proceeds.

It has been found that trichlorobenzene may be produced in essentially any type of process reactor to produce a product having a relatively low concentration of tetrachlorobenzene if the products of the reactor are continuously stripped of dichlorobenzenes and monochlorobenzene and this fraction is continuously recycled through the reactor along with a fresh feed of benzene and chlorine in the desired proportions. The chlorine feed is maintained at approximately 3:1 mole ratio relative to the fresh benzene feed. The actual formation of tetrachlorobenzene is dependent upon the type of reactor employed, but principally it is a function of the ratio of recycled material to the feed material. Generally speaking, a process carried out in any type of reactor will result in lower tetrachlorobenzene formation at any finite recycle ratio.

In general, it is preferred to employ a continuous process. While batch methods are justified for small-scale production or intermittent operation, in large scale operations a batch process usually compares unfavorably with a continuous operation. Continuous methods effect a savings in operating labor, increase the capacity of the plant and result in a more uniform product. In addition, higher yields are obtainable with continuous operation of the present process due to better control of the reaction conditions.

While a typical batch process could be devised using the novel features of the present invention to produce a superior product, the above disadvantages of batch operation normally outweigh the advantages accruing from the improved product resulting therefrom. Moreover, while batch conditions may be simulated in a continuous manner of operation by employing a pipe-type continuous reactor, having essentially no backmixing, the latter process requires an excessively large number of chlorine injection stages. Such multiple chlorine injection and distribution is normally excessively costly and troublesome and is not generally practical for the small improvement obtained in the product.

In view of the above, it is generally preferred to carry out the process of forming trichlorobenzene in a pot-type continuous reactor while recycling the lower chlorinated benzene fraction (dichlorobenzenes and monochlorobenzene) through the reactor along with the fresh benzene and chlorine feed. The process is preferably conducted in a plurality of stages and at an optimum recycle, for the particular number of stages, to give the desired low concentration of tetrachlorobenzene while, at the same time, obtaining maximum throughput capacity from the process equipment.

With particular reference to Figure 1, it will be noted that in employing a pot-type continuous reactor, the percent by weight of the undesired tetrachlorobenzene impurity obtained in the trichlorobenzene product is a function of the number of stages used to complete the reaction and also the recycle ratio of the weight of the stripped lower chlorinated benzenes relative to the weight of the fresh feed benzene. The latter factor is clearly the principal variable in this regard. Using a two stage process, for example, the concentration of the tetrachlorobenzene impurity may be reduced from about 51 percent by weight to about 6.5 percent while varying the recycle ratio from zero to ten. In contrast, increasing the number of stages in the process from one stage to two stages, only decreases the undesired tetrachlorobenzene approximately two percent. In general, a recycle ratio of between about 5 and 15 is desired.

Figure 2:
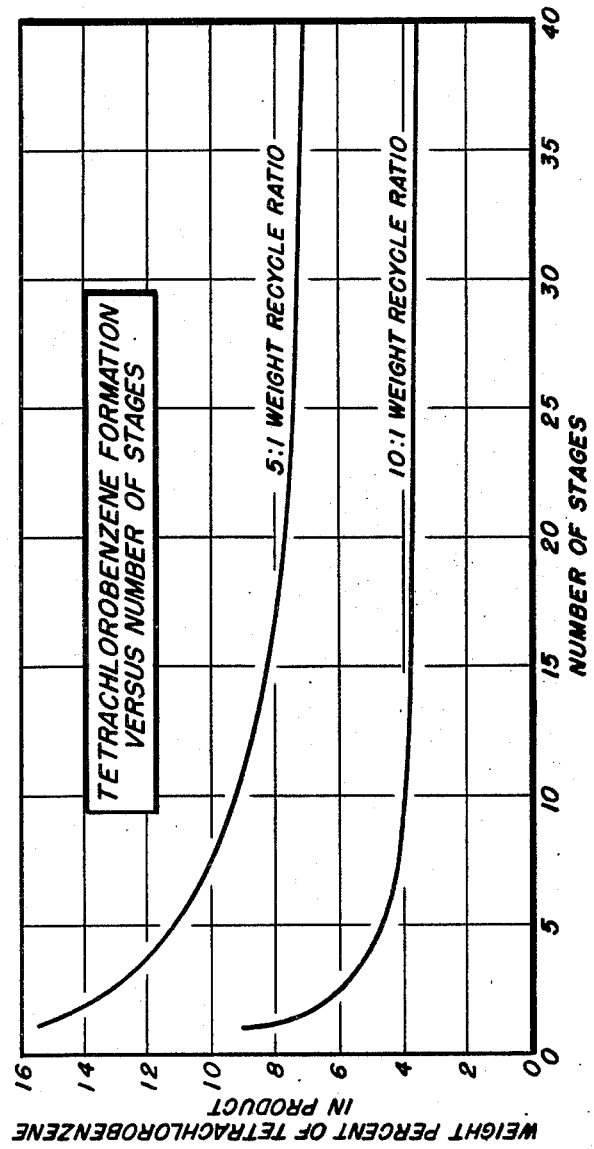

The effect of varying the number of stages on the percent yield of tetrachlorobenzene is illustrated more completely in Figure 2. From this plot of weight percent of tetrachlorobenzene formation versus the number of stages at different recycle ratios, it is believed apparent that increasing the stages from 1 to about 5 substantially reduces the tetrachlorobenzene formation, whereas further increases in the number of stages does not materially affect the composition of the product in regard to this impurity. The major reduction in the undesired tetrachlorobenzene is effected by increasing the stages from one to two.

In actual operation, where it has been desired to produce a trichlorobenzene product have a concentration of tetrachlorobenzene no greater than 10 weight percent, it has been found most desirable to employ a two-stage process operating with a recycle ratio of 10. In using a two-stage process, the benzene feed is continuously fed into the first reactor and the chlorine feed is divided, half of the chlorine being continuously fed into the first reactor while the remaining portion of chlorine is fed into the second reactor. As will be noted from Figure 1, using a recycle ratio of 10 in a two-stage process, the average product will contain only approximately seven (7) percent tetrachlorobenzene as an impurity and thus, in actual operation, no difficulty is experienced in maintaining a product having a maximum of 10 weight percent tetrachlorobenzene.

Figure 3:
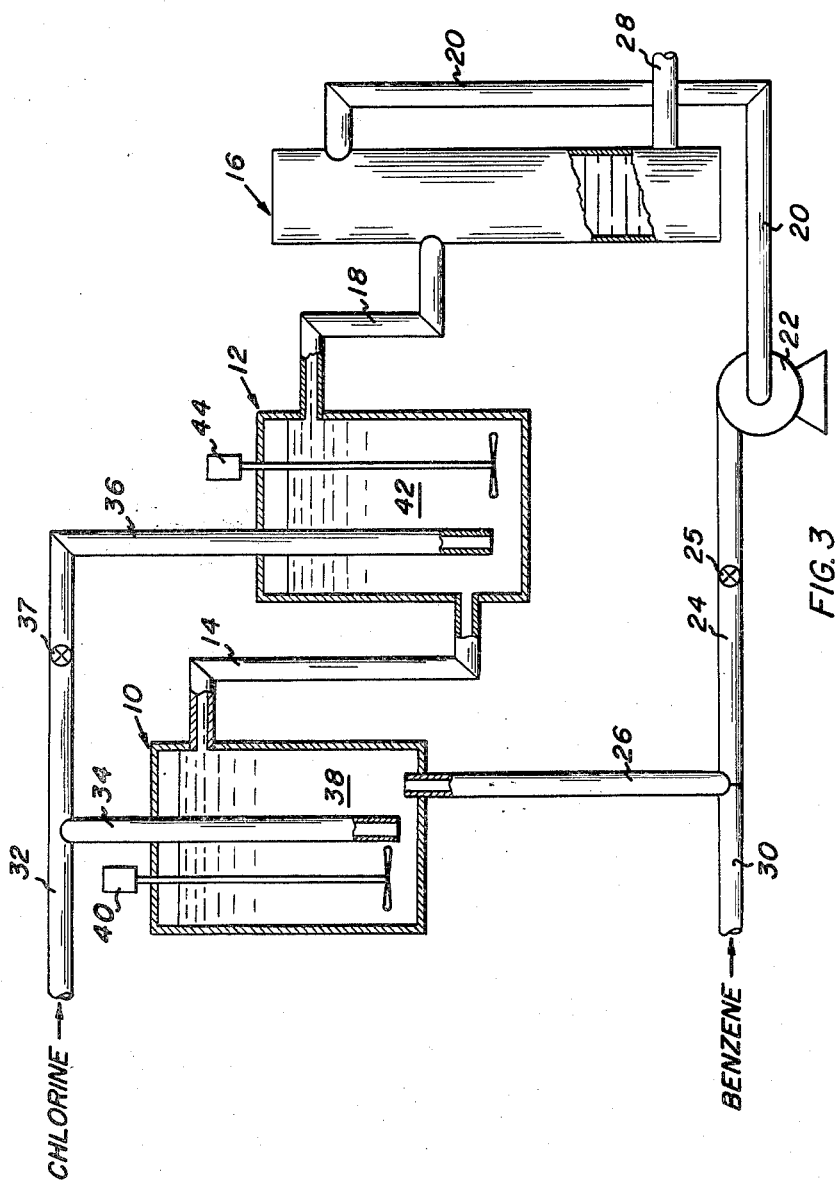

As shown in Figure 3, a simplified apparatus is disclosed for carrying out a process embodying the features of the present invention. The apparatus comprises generally a pair of closed reaction vessels 10 and 12 connected in series by a conduit 14, and a fractionating column 16, connected to the second reactor 12 by means of conduit 18. The fractionating column 16 is provided with an overhead conduit 20 connected to a pump 22 and conduits 24 and 26 providing for recycle of the lighter or overhead fraction to the first reactor 10 and also a conduit 28 for carrying the trichlorobenzene product to any suitable recovery system. A benzene feed line 30 joints the recycle conduit 24 from whence the benzene is fed into the bottom of the first reactor 10 along with the recycle stream through the conduit 26. A valve 25 is provided in the line 24 to permit variations in the recycle ratio (the weight of the light fraction relative to the weight of fresh feed benzene). A chlorine feed line 32 originating at any suitable source of chlorine is connected to the conduits 34 and 36 which enter through the tops of the reactors 10 and 12, respectively, and terminate adjacent the bottoms thereof. A valve 37 is also provided in the line 32 to control the chlorine feed to the second reactor 12.

The liquid reaction mass 38 in the first reactor 10 is maintained substantially homogeneous throughout by means of a mechanical rotary mixer 40 whereas the liquid reaction mass 42 in the second reactor 12 is maintained substantially homogeneous throughout by means of the rotary mixer 44.

The fractionating column 16 is illustrated schematically in the drawings as a conventional plate-type column, but it may be a packed column or even a simple flash drum, if desired.

The contact time required for carrying out the process depends upon the number of stages employed to complete the reaction and also the temperature at which the reaction is conducted. In general, as the number of stages for the process is increased, the contact time per pass within each reactor may be reduced. Also, if the temperature of the reaction is increased, the contact time required to complete the reaction to trichlorobenzene is decreased.

The temperature required to carry out the process in accordance with the present invention is not particularly critical, but in general may be conducted between about the range of 60° to 100° C. It is normally preferred to conduct the process at about 65° C. since lower temperatures tend to produce a product somewhat lower in the tetrachlorobenzene impurity. Also, the process is generally carried out at approximately atmospheric pressure.

The following are specific examples which will serve to illustrate preferred modes of carrying out the process embodying the features of the present invention:

*Example I*

A process embodying the features of this invention was carried out under typical batch-type conditions in the reactor 10, shown in the drawings. 100 grams of benzene and 1,003 grams of recycled solution were placed in the reactor 10 in contact with 3½ grams of iron nails employed as a catalyst. Thus, in this example, the recycle ratio was 10:1. The temperature was maintained during the reaction at 60° C. and atmospheric pressure was employed. Chlorine was fed into the reactor through lines 32 and 34 at a substantially constant rate over a 13 hour period. During this experiment, the valve 37 was closed. A total weight of 272 grams of chlorine was employed giving a 3:1 chlorine to benzene ratio. The reaction mass was continuously agitated by means of stirrer 40 to maintain a substantially homogeneous mixture throughout the reactor at any given time. An overall material balance for the process was 99 percent, small quantities of hydrogen chloride being lost during the process.

The recycle solution had the following compositions in mole percent:

| | Per cent |
|---|---|
| Monochlorobenzene | 3.0 |
| Orthodichlorobenzene | 19.0 |
| Paradichlorobenzene | 78.0 |

The product obtained from reactor 10 had the following compositions in weight percent:

| | Per cent |
|---|---|
| Benzene | 0.0 |
| Monochlorobenzene | 0.0 |
| Dichlorobenzenes | 84.9 |
| Trichlorobenzenes | 14.6 |
| Tetrachlorobenzenes | 0.5 |

After fractionation of the above product in the column 16, a final product was obtained through the line 28, having the following composition in parts by weight:

| | Per cent |
|---|---|
| Trichlorobenzene | 96.7 |
| Tetrachlorobenzene | 3.3 |

*Example II*

Chlorine and benzene in the mole ratio of 3.06:1 were continuously fed into the reactor 10 through the lines 32 and 30 respectively and reacted in two stages under typical pot-type continuous conditions. The benzene feed was at the rate of 43 grams per hour through the line 30. A recycle stream was pumped to the reactor 10 through the pump 22 at the rate of 430 grams per hour. The chlorine feed was equally divided between the two reactors and had a rate to each reactor through the lines 34 and 36 respectively of 60 grams per hour. The reaction mass in both reactors 10 and 12 was agitated to maintain a homogeneous mixture throughout the reactors.

The composition of the recycle solution in mole percent was:

| | Per cent |
|---|---|
| Monochlorobenzenes | 1.72 |
| Orthodichlorobenzenes | 17.24 |
| Paradichlorobenzenes | 81.00 |

Iron nails were provided as a catalyst in each of the reactors 10 and 12. The temperature was maintained at 62° C. in each reactor and the pressure was atmospheric. The specific gravity of the product of the first reactor, such as in the line 14, was 1.245 at 50° C. The total chlorine conversion in the process was 93.2 percent over a 5-hour run. The reacted chlorine to benzene mole ratio equalled 2.84.

The composition of the product in weight percent was the following:

| | Per cent |
|---|---|
| Benzene | 0.0 |
| Monochlorobenzene | 0.0 |
| Dichlorobenzenes | 84.7 |
| Trichlorobenzenes | 14.7 |
| Tetrachlorobenzenes | 0.6 |

After fractionation of the above product in the column 16, a final product was obtained having the following composition in percent by weight:

| | Per cent |
|---|---|
| Trichlorobenzene | 96.1 |
| Tetrachlorobenzene | 3.9 |

The reactor solutions 38 and 42 at the beginning of this example were the same as is attained after operating the process for 18½ hours under generally similar conditions.

*Example III*

Chlorine and benzene in the mole ratio of 3:1 is fed to the reactors through the lines 32 and 30 respectively, the chlorine being split into two equal portions for feeding into the reactors 10 and 12 through lines 34 and 36 respectively. Benzene is fed at the rate of 45 grams per hour. Each of the reactors is maintained at approximately atmospheric pressure and at a temperature of about 65° C. The reaction mass in each reactor is agitated to maintain essentially homogeneous, overflow composition throughout the entire reactor. The product of the second reactor is fractionated in the fractioning column 16. The lighter fraction, containing dichlorobenzenes and monochlorobenzene, is recycled through the lines 20, 24 and 26 and recirculated by means of pump 22 to the first reactor 10. After a steady state condition is obtained in the process, the weight ratio of recycle stream to fresh benzene is maintained at 10:1 and the composition of the product of the second reactor and the recycle stream in mole percent has the following composition:

| | Mole per cent |
|---|---|
| Monochlorobenzene | 1.5 |
| 1,2 dichlorobenzene | 15.0 |
| 1,4 dichlorobenzene | 68.7 |
| 1,2,3 trichlorobenzene | 2.0 |
| 1,2,4 trichlorobenzene | 12.0 |
| Tetrachlorobenzene | 0.8 |

The recovered trichlorobenzene product obtained through line 28 contains 4.6 weight percent tetrachlorobenzene.

The average contact time in each of the reactors is about one minute. Ferric chloride is employed as a catalyst.

*Example IV*

The process of Example I is conducted in a one-stage pot-type continuous reactor having the valve 37 closed to confine chlorine feed to the first reactor and using the same mole ratio of chlorine to benzene (3:1). A recycle ratio of 10:1 is also employed. Product composition is maintained throughout the first reactor 10 and comprised the following composition in mole percent:

| | Mole per cent |
|---|---|
| Monochlorobenzene | 2.0 |
| 1,2 dichlorobenzene | 14.0 |
| 1,4 dichlorobenzene | 67.0 |
| 1,2,3 trichlorobenzene | 2.0 |
| 1,2,4 trichlorobenzene | 13.0 |
| Tetrachlorobenzene | 1.0 |

The contact time in this run is 10 minutes. The reactors are maintained under essentially atmospheric pressure and the reaction is conducted at 65° C.

When employing a different number of stages and different recycle ratios, generally similar results are obtained. However, the particular percentage of the undesired tetrachlorobenzene impurity varies with the above different conditions in accordance with the data shown in the graphs of Figures 1 and 2.

It is believed apparent from the foregoing that the present process permits the manufacture of a trichlorobenzene product having a relatively low concentration of undesired tetrachlorobenzene as an impurity therein. While the process may be conducted as a batch process, the process may be and is preferably conducted in a continuous manner. The use of a recycle in the process permits high throughput capacities from any suitable process equipment, while still maintaining low percentages of undesired tetrachlorobenzene.

The process may be initially regulated by means of variations in the recycle ratio to provide essentially any purity of product, with respect to tetrachlorobenzene, and may be controlled during actual operation to maintain the desired and anticipated results. By means of the data disclosed herein, the most economical and efficient process equipment and process conditions may be readily selected for any purity of trichlorobenzene product desired.

We claim:

1. A continuous process for the manufacture of a trichlorobenzene product having a relatively low concentration of tetrachlorobenzene as an impurity therein, comprising the steps of continuously reacting chlorine and liquid benzene in the presence of iron in a reaction zone at a temperature of between about 60–100° C. and in a mole ratio of chlorine to benzene feed of about 3:1 to produce trichlorobenzene, distilling the product of the reaction to separate the same into a first fraction containing principally trichlorobenzene and a second fraction containing principally lower chlorinated benzenes, and continuously recycling said second fraction to said reaction zone along with the fresh chlorine and benzene, the weight ratio of said second fraction and the fresh benzene feed being between 5:1 and 15:1.

2. A continuous process for the manufacture of a trichlorobenzene product having a relatively low concentration of tetrachlorobenzene as an impurity therein, comprising reacting chlorine and benzene in the presence of iron in a plurality of successive reaction zones in series to produce trichlorobenzene, the temperature of the reaction being maintained between about 60–100° C. in each of said zones, the chlorine feed being equally divided between said zones, the fresh benzene being fed only to the first zone and substantially the entire reaction mixture therefrom being fed to a subsequent zone, agitating the reactants in each reaction zone to provide a homogeneous reaction mass, distilling the product of the reaction of the last zone to separate the same into a fraction containing principally trichlorobenzenes and higher chlorinated benzenes and a second fraction containing principally lower chlorinated benzenes, and continuously recycling said second fraction to the first reaction zone along with fresh chlorine and benzene feed, the rate of chlorine feed being in the mole ratio of approximately 3:1 relative to the rate of feed of the fresh benzene, and the weight ratio of the second fraction to the fresh benzene feed being between about 5:1 to 15:1.

References Cited in the file of this patent

UNITED STATES PATENTS

| Number | Name | Date |
| --- | --- | --- |
| 1,923,419 | Britton | Aug. 22, 1933 |
| 1,934,675 | Mills | Nov. 7, 1933 |
| 2,123,857 | Wibaut et al. | July 12, 1938 |
| 2,527,606 | Webb | Oct. 31, 1950 |

FOREIGN PATENTS

| Number | Country | Date |
| --- | --- | --- |
| 605,693 | Great Britain | July 28, 1948 |